United States Patent [19]

Zbikowski et al.

[11] Patent Number: 5,590,318
[45] Date of Patent: Dec. 31, 1996

[54] METHOD AND SYSTEM FOR TRACKING FILES PENDING PROCESSING

[75] Inventors: Mark Zbikowski, Woodinville; Brian T. Berkowitz, Bellevue; Robert I. Ferguson, Seattle, all of Wash.

[73] Assignee: Microsoft Corporation, Redmond, Wash.

[21] Appl. No.: 154,582

[22] Filed: Nov. 18, 1993

[51] Int. Cl.$^6$ ........................ G06F 17/30
[52] U.S. Cl. ............... 395/618; 395/182.13; 395/182.17; 395/182.18
[58] Field of Search ............... 395/600, 575, 395/180, 182.03, 182.13, 182.17, 182.18; 371/16.5, 29.1

[56] References Cited

U.S. PATENT DOCUMENTS

| | | | |
|---|---|---|---|
| 4,425,618 | 1/1984 | Bishop et al. | 395/375 |
| 4,819,159 | 4/1989 | Shipley et al. | 395/575 |
| 5,089,954 | 2/1992 | Rago | 395/600 |
| 5,123,104 | 6/1992 | Levine et al. | 395/600 |
| 5,150,473 | 9/1992 | Zulch | 395/489 |
| 5,251,316 | 10/1993 | Anick et al. | 395/600 |
| 5,267,872 | 1/1994 | Lomet et al. | 395/600 |
| 5,278,982 | 1/1994 | Daniels et al. | 395/600 |
| 5,280,611 | 1/1994 | Mohan et al. | 395/600 |
| 5,347,653 | 9/1994 | Flynn et al. | 395/600 |

FOREIGN PATENT DOCUMENTS

WO93/22719 11/1993 WIPO.

OTHER PUBLICATIONS

Jaideep Srivastava et al., "Efficient Algorithms for Maintenance of Large Database Indexes," 4th Int'l Conf. on Data Engineering, 1988 IEEE, pp. 402–408.

*Primary Examiner*—Paul V. Kulik
*Attorney, Agent, or Firm*—Seed and Berry LLP

[57] ABSTRACT

A portion of a first storage stores identifying information of files to be processed by a computer. The files are stored in a second storage, with each file having associated identifying information which identifies the file, and each file including an update sequence value which indicates an order in which the file is to be processed by the computer. A threshold value is provided which is set equal to a largest update sequence value retrieved from the file that have been processed by the computer. In response to a loss of the file identifiers stored in the portion of the first storage, the file identifier for each file whose update sequence value is beyond the threshold value is stored in the portion of the first storage.

17 Claims, 9 Drawing Sheets

FIG. 9

Changes Table

File          Identifiers     119

DELETION LOG

| File Identifier (501) | Update Sequence Number (503) |
|---|---|
|  |  |
|  |  |
|  |  |
|  |  |
|  |  |
|  |  |
|  |  |
|  |  |
|  |  |

METHOD AND SYSTEM FOR TRACKING FILES PENDING PROCESSING

TECHNICAL FIELD

The invention relates to a computer method and system for tracking files in a system that have been changed.

BACKGROUND OF THE INVENTION

Existing data processing systems provide the capability to index the contents of files. These systems typically store indexing data in a data structure so that it can be accessed and manipulated to answer user-generated queries efficiently. An index contains indexing data derived from a file that allows queries about the content of the file to be performed efficiently. For example, an index of a file may contain an alphabetical listing of each major word of the file along with the locations at which the major word appears in the file. These major words are known as "keywords" and the locations are known as "occurrences".

As the number of files requiring indexing in a data processing system increases, the system can no longer immediately index the data in each file. This inability to immediately index files creates a backlog of files awaiting indexing. The backlog of files is often maintained by storing in a table a file identifier uniquely identifying each file in the backlog.

However, a problem arises if the file identifiers listed in the table are lost, for example, due to a power failure, because the files associated with the lost file identifiers are never indexed by the computer system. In order to track files in a manner which ensures that the files will be indexed, conventional systems store the table on a non-volatile store, such as a disk drive. However, storing the table in a non-volatile store has a negative impact on system performance because of the relatively large amount of processor time that it takes to write data to disk and to read data from disk. Therefore, systems employing this method track files inefficiently.

Other conventional systems track files by storing file identifiers for the files in a table in a non-volatile store, storing a time stamp in each file, and storing the file on a non-volatile store. The time stamp typically includes the date and time of a file's creation or last revision. When the file identifiers stored in the table are lost, the system restores the file identifiers to the table by comparing a time stamp from the last processed file with the time stamp stored in each file. For each file whose time stamp is later than the time stamp on the last processed file, the system stores the file identifier for the file in the table. However, a problem arises with this method of tracking files because this method is sensitive to uniformity of time. For example, during daylight savings time, when time "falls back" one hour, this method can fail to accurately track files after data in the table has been lost, because some files created or revised after the switch to daylight savings time will have an earlier time stamp than those files created or revised before the switch to daylight savings time. Therefore, prior systems employing this method fail to accurately track files.

While the example set forth above tracks files in order to index the data in the files, it should be understood that the purpose behind tracking files is not so limited. Instead, files may be tracked so that any of a number of types of processing can be performed on the files.

SUMMARY OF THE INVENTION

An object of the invention is to provide a method and system which tracks changed files in order to ensure that all changed files will be processed by the system.

An object of the invention is to provide a method and system for tracking changed files by recovering data lost from a storage device.

Another object of the invention is to provide an update sequence number in an efficient manner.

These and other objects, which will be apparent as the invention is more fully described, are provided by a method of and system for tracking changed files by recovering from loss of data in a storage device. A preferred embodiment of the present invention provides a changes table for storing file identifiers which identify files to be processed by the system. The system receives a request to process a file. When the system receives the request, it determines what type of request it has received.

If the request is to save the file, then the system computes an update sequence number which indicates the order in which the request was received by the system. The update sequence number is also used by the system to restore data to the changes table after the data has been lost from the changes table. The system then stores the update sequence number in the file's metadata and stores the file containing the update sequence number in a permanent storage device. Finally, the system stores the file identifier for the file in the changes table.

If the request is to delete the file from the permanent storage device, then the system retrieves from the request a file identifier uniquely identifying the file to be deleted. Then the system computes the update sequence number and stores both the retrieved file identifier and the computed update sequence number in a non-volatile deletion log. The deletion log is used by the system to restore data to the changes table after the data has been lost from the changes table. Finally, the file is deleted.

Once the file identifiers for the files have been restored to the changes table, the system performs background processing on each file identified by the file identifiers. The background processing of files typically includes storing in a file index words from the file along with the position of the words within the file.

BRIEF DESCRIPTION OF THE DRAWINGS

FIG. 1 is a block diagram of a system embodying the present invention for tracking changed files and for performing background processing on the changed files.

DETAILED DESCRIPTION OF THE INVENTION

An embodiment of the present invention provides an efficient and robust means for tracking files that have changed. Each file is assigned a serial number when created and each time a file is changed, its serial number is updated to a new value. As will be explained in more detail below, the serial number is not a time stamp but rather is the value of a monotonically increasing or decreasing counter for the purposes of this application, the terms serial number, update sequence number and update sequence value will be used interchangeably. Since many changes cannot be immediately made to related file data, such as a content index for a file, there is a threat of the changes being lost before the changes are made to the related file data. The serial number is found for the last file that has both been changed and that has had its related file data updated to reflect the changes. This serial number is used to determine which files have related file data that need to be updated upon recovery from an event that caused loss of the changes. The changes are also stored persistently so that they may be implemented upon recovery.

The embodiment of the present invention described below concerns an implementation that is adapted for use in a content indexing scheme. In the content indexing scheme, a separate content index is maintained for each file. Nevertheless those skilled in the art will appreciate that the present invention may also be implemented in other environments wherein files are awaiting other types of processing. The preferred embodiment of the present invention will be described below relative to a system for indexing the contents of files.

FIG. 1 is a block diagram of a computer system 100 for practicing the preferred embodiment of the present invention. The computer system 100 includes a computer 101, a video display 103, a keyboard 105 and a permanent storage device 107, such as a disk drive. The computer 101 includes a central processing unit (CPU) 109, a volatile computer memory 111 and an interface 113 for enabling communicating between the CPU and peripheral devices, such as the video display 103, the keyboard 105 and the permanent storage device 107. The contents of the permanent storage device 107 will be described in more detail below. The computer memory 111 holds a number of items, including a copy of an operating system 115 that provides a file system 117. The components of the file system 117 and the other items held in the computer memory 111 will be described in more detail below.

The computer system 100 tracks files that have changed in order to perform background processing on the changed files. In the embodiment described herein, the background process is responsible for updating the content indices of the files. A background process is a process that is performed in the background rather than the foreground. A background process is performed only when a foreground process is not using the CPU 109. In response to a request to save a file that has been newly created or newly modified, the computer system 100 performs the foreground process of saving the file to the permanent storage device 107, and performs the background process of indexing the data in the file so that queries related to the file can be carried out quickly and efficiently. Those of ordinary skill in the art will understand that background processing is not limited to indexing data in files.

Figure 2:
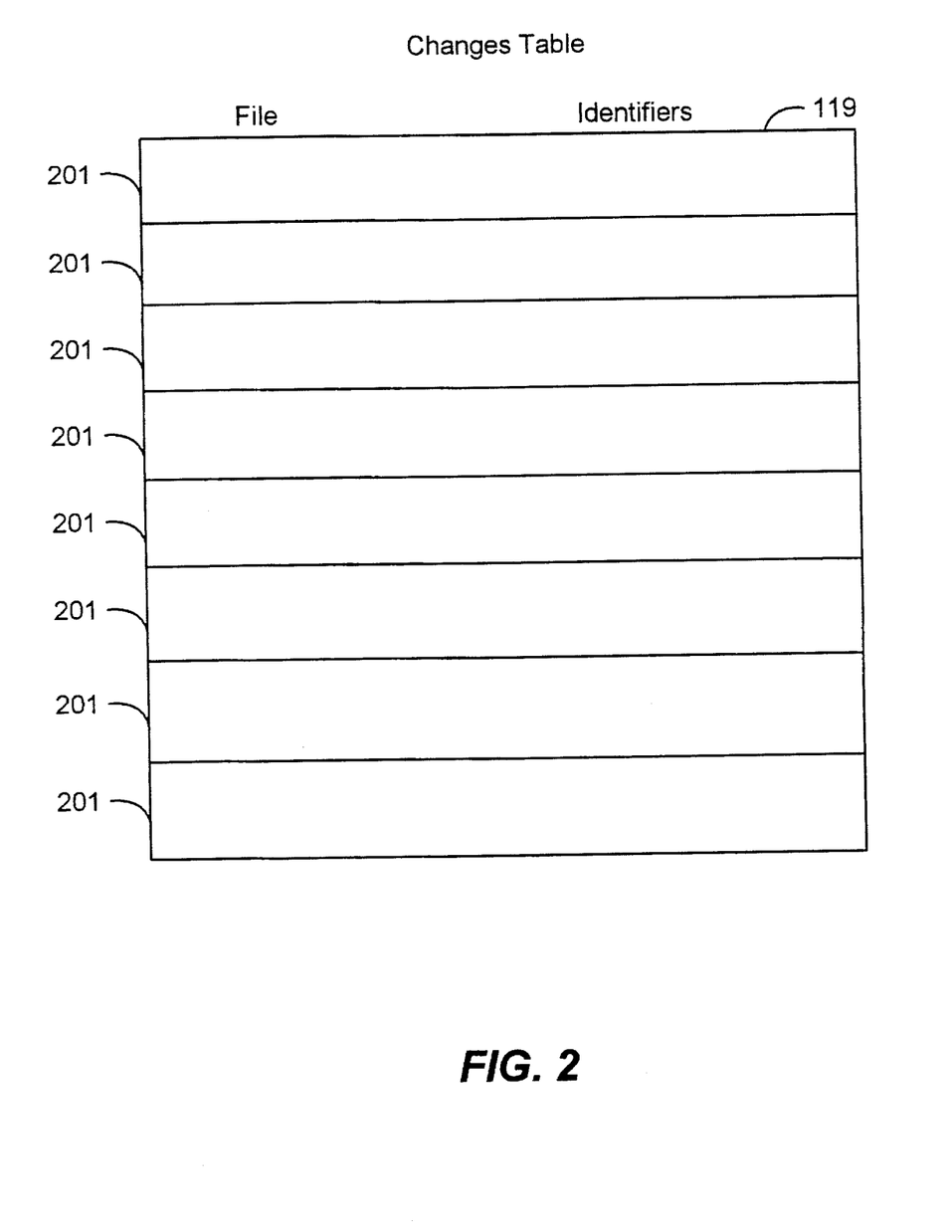
FIG. 2 is a changes table for the system of FIG. 1.

Because the process of updating the content indices of files is a background process, all of the files to be processed cannot generally be processed during a single time frame in which the background process is granted the CPU 109. As a result, a back log of files to be processed often develops. A list of these files waiting to be processed is preferably stored in a data structure known as a changes table 119 in the computer memory 111. FIG. 2 is a block diagram of the format for the changes table 119. The changes table holds a list of file identifiers 201 that uniquely identify the files stored in the computer system 100. The changes table 119 provides the system with a mechanism for monitoring what files need to be processed to update their content indices.

One difficulty in relying on the changes table 119 is its volatility. If the list of file identifiers 201 stored in the changes table 119 is permanently lost, such as from power failure in the computer system 100, the computer system 100 is unable to perform background processing on the associated files upon computer system restart. A preferred embodiment of the present invention ensures that the list of file identifiers stored in the changes table 119 can be recovered and therefore ensures that the changes made to the files are persistently tracked. In this way, the present invention ensures that all the files awaiting processing to update their content indices are processed.

The operation of the preferred embodiment of the present invention is perhaps best explained by way of example. A first step, performed by the preferred embodiment of the present invention is populating the changes table 119. The process of populating the changes table 119 with the list of files awaiting background processing is typically user initiated. Suppose that a user edits a file 121 (FIG. 1) with a word processing program 123 that executes on the CPU 109. Further, suppose that the user enters a request on keyboard 105 to save file 121 by interacting with a user interface provided on the video display 103 by the word processing program. The word processing program 123 interprets the user's action as a save request and forwards the request to the file system 117 of the operating system 115.

In response to the request, the file system 117 invokes a program 125 for processing file system requests which performs the foreground processing needed to carry out the request. In addition, the program 125 for processing file system requests performs the steps necessary to ensure proper background processing of the saved file. The program 125 for processing file system requests adds a file identifier for the file 121 to the list stored in the changes table 119. The program 125 for processing file system requests is responsible for maintaining a list of files in the changes table 119, and is responsible for maintaining the data necessary to recover the list of files awaiting background processing should the list of files be lost from memory 111.

While the preferred steps of the method for recovering the list of files stored in the changes table 119 after the list has been lost are discussed in detail below in connection with a program 127 for recovering lost changes table data (FIG. 6), a brief overview of the preferred recovery process will help place the steps performed by the program 125 for processing file system requests into their proper context. In short, the program 125 for processing file system requests assigns a unique number, known as an "update sequence number", to each file that is changed in the computer system 100 when the file is created, saved, or deleted. The program 125 for processing file system requests then stores the update sequence number in the meta data maintained for the file. When the file identifiers 201 stored in the changes table 119 are lost, the program 127 for recovering lost changes table data retrieves the update sequence number associated with each file stored in the system 100. The program 127 then compares the retrieved update sequence numbers for the files against a threshold value that specifies the largest update sequence value from a file which the system has processed to update the file's content index. For each retrieved update sequence number that is greater than the threshold value, the file identifier 201 of the file associated with the update sequence number is again stored in the changes table 119. By the time the program 127 for recovering lost changes table data completes its processing of the update sequence numbers, the changes table 119 is populated with all the file identifiers for files awaiting background processing by the computer system 100. Thus, by creating and storing the update sequence number in the files, the program 125 for processing file system requests helps ensure that files awaiting background processing by the computer system 100 are persistently tracked.

Figure 3:
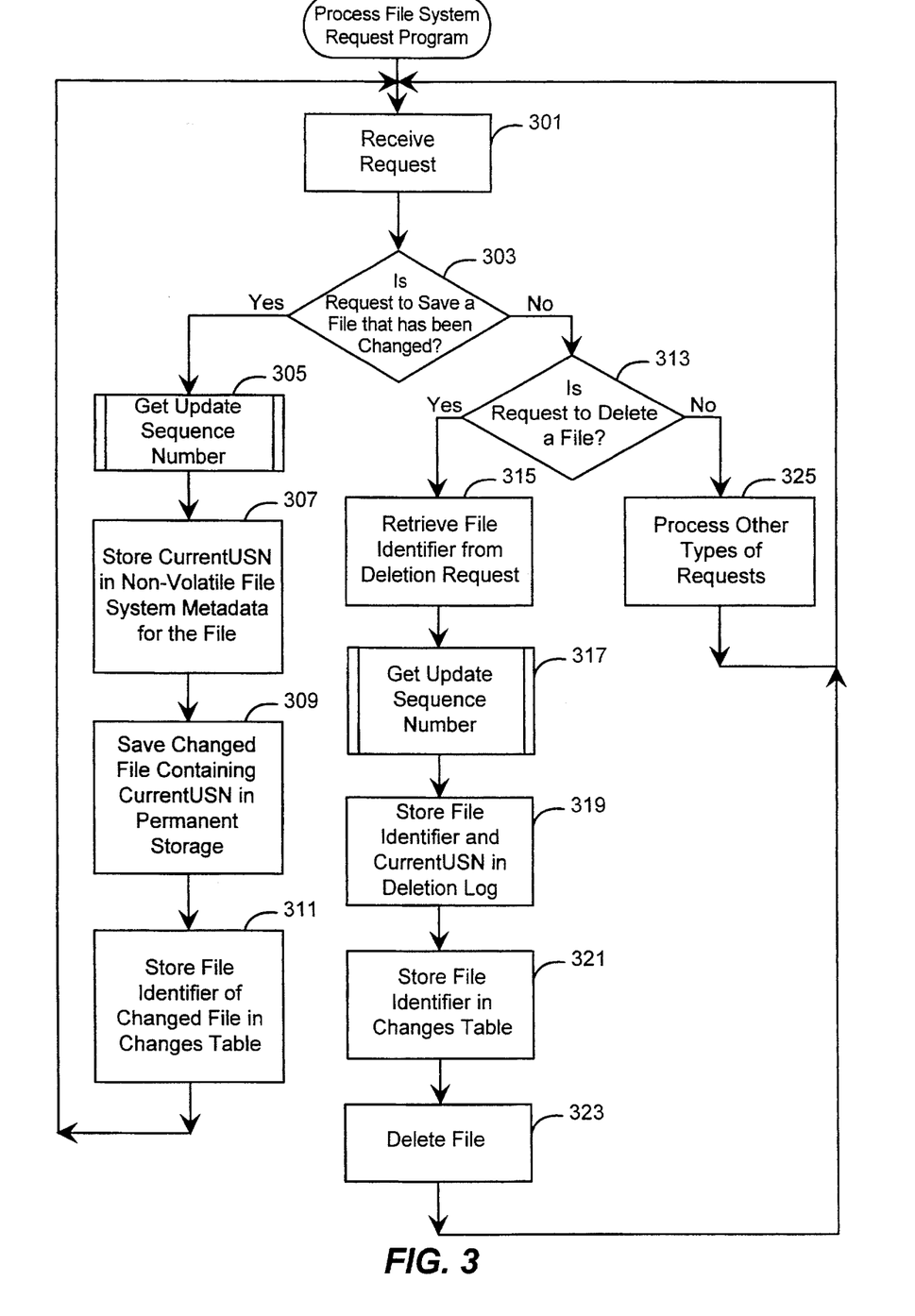
FIG. 3 is a flow diagram of the program for processing file system requests for the system of FIG. 1.
Figure 4:
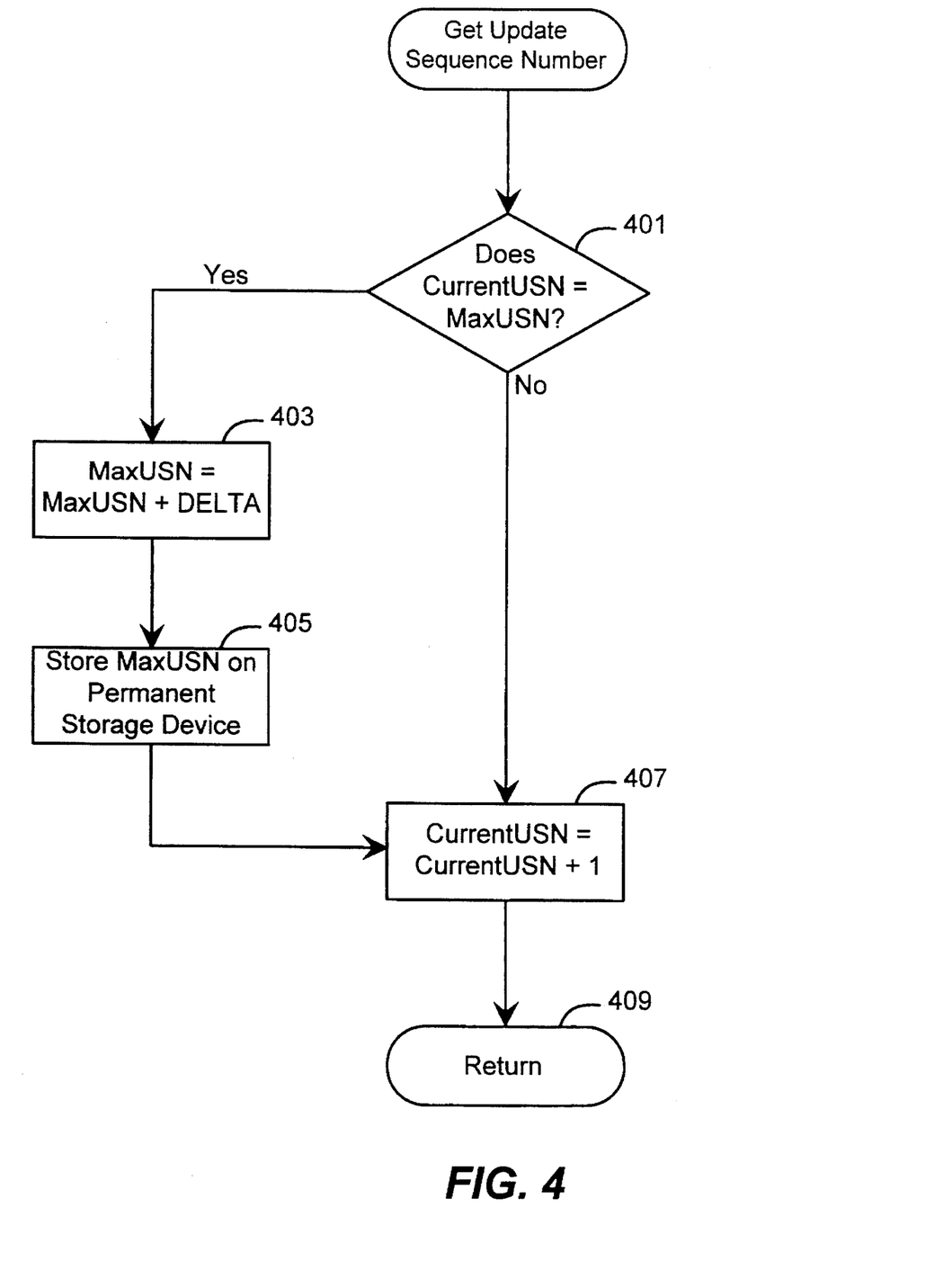
FIG. 4 is a flow diagram of the method to get an update sequence number for the system of FIG. 1.

FIG. 3 is a flowchart of the steps performed by the program 125 for processing file system requests. In step 301, the program 125 for processing file system requests receives the request to perform an operation on the file 121 stored in the computer memory 111 from the file system 117. In the example discussed above, this request was a file save request. In step 303 the program 125 determines whether the request is to save a file that has been changed. In the preferred embodiment, the file has been changed if a file has been created or edited. If the file has been changed, then in step 305, the program 121 for processing file system requests calls method 128 to get an update sequence number (FIG. 4). The method 128 to get an update sequence number returns an update sequence number for the file 121. The update sequence number uniquely identifies the order in which the file system 117 receives requests to be processed and is used by the computer system 100 to restore lost file identifiers 201 to the changes table 119.

In order to return the update sequence number, the computer system 100 maintains in the computer memory 111 a variable named CurrentUSN 129, which stores a monotonically increasing counter that is always incremented each time the file system 117 receives a new request to save or delete a file. CurrentUSN 129 is maintained in a volatile memory which is subject to loss, such as computer memory 111. "Monotonically increasing" implies that the value always increases each time that it is incremented such that the value never decreases or remains unchanged. In addition to the variable CurrentUSN 129, the computer system 100 maintains a variable named MaxUSN 131 having a value that specifies an upper limit on the values that can be validly assigned to the variable CurrentUSN 129 during background processing operations. MaxUSN 131 is preferably maintained in both a volatile memory such as the computer memory 111, and a non-volatile memory such as the permanent storage device 107. When the value of CurrentUSN 129 equals the value of MaxUSN 131, a new upper limit is created by method 128 to get an update sequence number by adding the value of a variable Delta 133 (preferably set to a predetermined positive number) to the value of MaxUSN 131. In this way the method 128 to get an update sequence number batch allocates a set of valid update sequence numbers in blocks of size Delta 133. Once the valid set of update sequence numbers has been allocated, the variable CurrentUSN 129 is incremented and returned to the program 125 for processing file system requests.

FIG. 4 is a flowchart of the steps performed by the method 128 to get an update sequence number. In step 401 the method 128 to get an update sequence number determines if the value of the variable CurrentUSN 129 is equal to the value of the variable MaxUSN 131. If the value of the variable CurrentUSN 129 is equal to the value of the variable MaxUSN 131, then in step 403, the method 128 to get an update sequence number sets the value of the variable MaxUSN 131 equal to the summation of the value of the variable Delta 133 and the value of the variable MaxUSN 131. In step 405, the method 128 to get an update sequence number then stores the variable MaxUSN 131 on the permanent storage device 107. The method 128 to get an update sequence number, upon completion of step 405, increments the value of the variable CurrentUSN 129 in step 407. Upon completion of step 407 the method 128 to get an update sequence number, in step 409, returns to the program 125 for processing file system requests of FIG. 3.

In step 401, if the value of CurrentUSN 129 is not equal to the value of the variable MaxUSN 131, the method 128 to get an update sequence number increments the value of the variable CurrentUSN 129 in step 407. Upon completion of step 407, the method 128 to get an update sequence number, in step 409, returns processing control of the CPU 109 to the program 125 for processing file system requests (FIG. 3).

Upon return of processing control from the method 128 to get an update sequence number in step 305 of FIG. 3, the program 125 for processing file system requests, in step 307, stores the value of the variable CurrentUSN 129 in the non-volatile file system meta data for file 121. The file system meta data is what the file system 117 uses to identify and describe the storage of a file. In step 309 the program 125 for processing file system requests saves file 121, containing the variable CurrentUSN 129, in the permanent storage device 107. In step 311 the program 125 for processing file system requests stores the file identifier for the file 121 in the changes table 119; thus indicating that the file 121 awaits background processing. Upon completion of step 311 processing continues with step 301.

Figure 5:
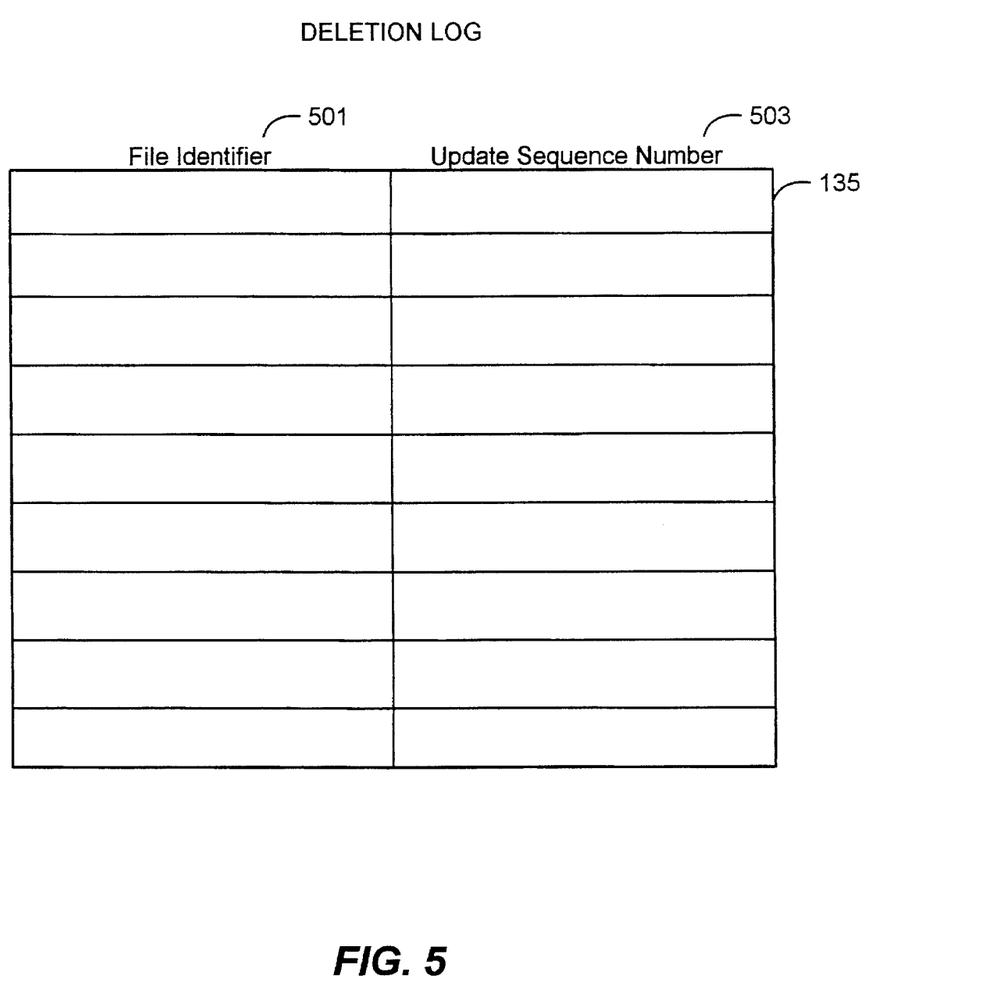
FIG. 5 is a block diagram of a deletion log for the system of FIG. 1.

Returning to the discussion of step 303, if the program 125 for processing file system requests determines that the request is not to save a file, then in step 313, the program 125 for processing file system requests determines whether the request is to delete a file. If the request is to delete the file then processing continues with step 315. In step 315 the program 125 for processing file system requests retrieves a file identifier that is included in the deletion request. The retrieved file identifier identifies the file to be deleted. For purposes of this example the retrieved file identifier identifies file 121. In step 317, the program 125 for processing file system requests calls method 128 to get an update sequence number. Method 128 returns the value of the variable CurrentUSN 129. The preferred steps of the method 128 to get an update sequence number are discussed in detail above with respect to FIG. 4. Upon return of processing control from the method 128 to get an update sequence number in step 317 of FIG. 3, the program 125 for processing file system requests, in step 319, stores the file identifier retrieved from the deletion request, along with the value of the variable CurrentUSN 129 returned from the method 128 to get an update sequence number, in the deletion log 135 (FIG. 5) stored on the permanent storage device 107. The deletion log 135 is used by the program 127 to recover the file identifiers 201 lost from the changes table 119. As FIG. 5 illustrates, the preferred deletion log 135 includes a file identifier 501 for identifying a file, and an update sequence number 503 indicating an order in which the file is to be processed in the background relative to other files. In step 323, the program 125 for processing file system requests deletes the file 121. Upon completion of step 323, processing continues with step 301.

If at step 313, it is determined that the request received in step 301 is not to delete a file then in step 325, the program 125 for processing file system requests uses normal processing techniques to process the request.

By the time the program 125 for processing file system requests completes its processing, the changes table 119 is populated with file identifiers 201 for all files awaiting background processing by the computer system 100. However, a problem arises if the list of file identifiers 201 stored in the changes table 119 are permanently lost, because the system 100 only performs background processing on files listed on the changes table 119. In order to avoid such a permanent loss of the file identifiers 201 and to instead recover the list of file identifiers lost from the changes table 119, the operating system 115 invokes the program 127 to recover last changes table data in response to a loss of the file identifiers 201 from the changes table 119.

In short, the program 127 to recover lost changes table data is preferably invoked by the operating system 101 in response to a reboot of the computer 101. The program 127 examines all files at reboot to identify those that are still awaiting background processing. The program 127 to recover lost changes table data determines the largest update sequence number from the set of files upon which the computer system 100 has performed background processing. The program 127 to recover lost changes table data then compares the update sequence number of each file stored on the permanent storage device with the determined update sequence number. For each update sequence number that is greater than the determined update sequence number, the program 127 to recover lost changes table data stores the file identifier for the associated file in the changes table 119 of the computer memory 111. By the time the program 127 to recover lost changes table data ends processing, all of the lost file identifiers have been restored to the changes table 119.

Figure 6:
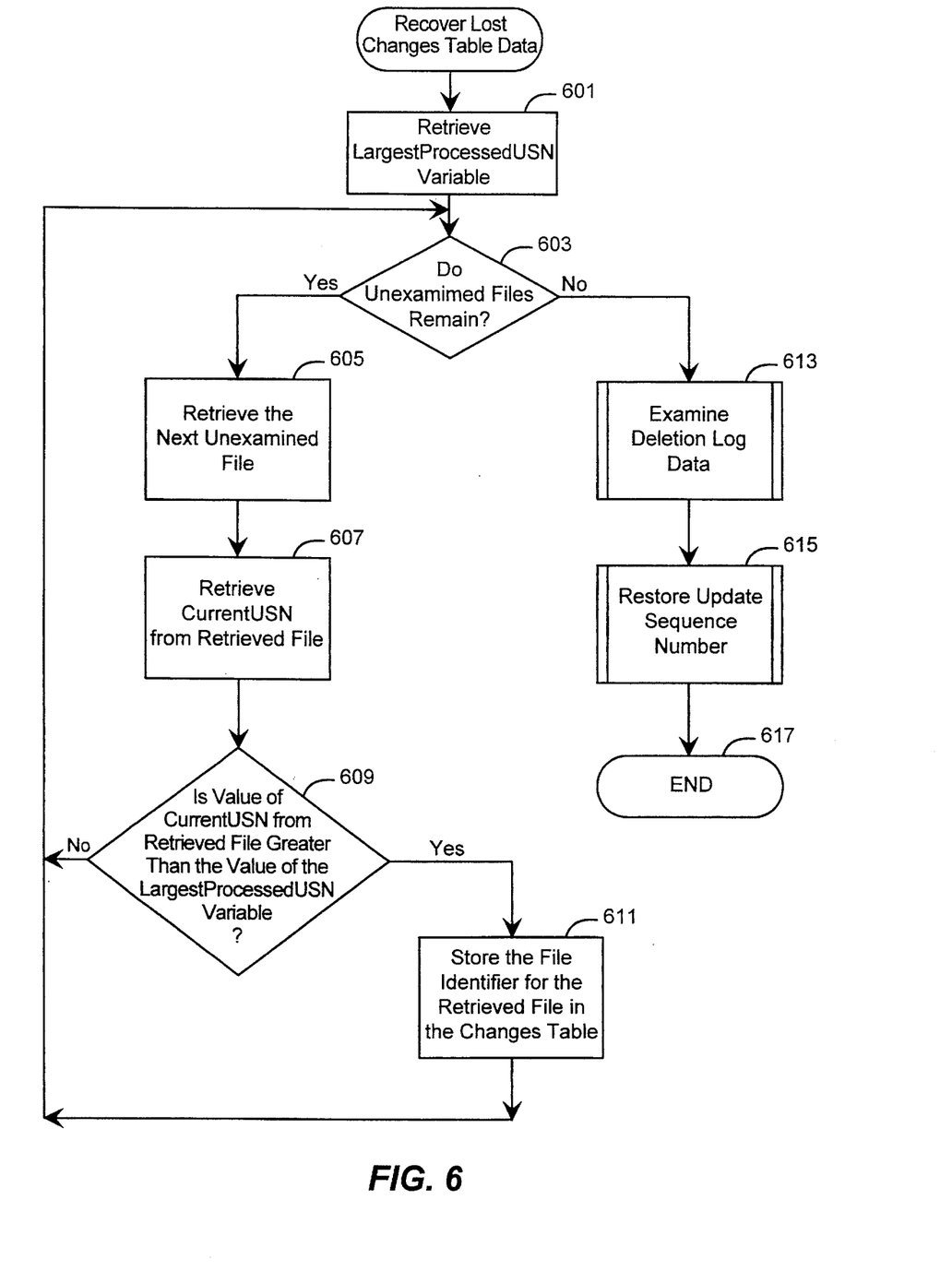
FIG. 6 is a flow diagram of the program to recover lost changes table data for the system of FIG. 1.

FIG. 6 shows the steps performed by the program 127 to recover lost changes table data. In step 601 of FIG. 6, the program 127 to recover lost changes table data retrieves a variable LargestProcessedUSN 139 that is stored on the permanent storage device 107. The variable LargestProcessedUSN 139 has a value equal to the largest update sequence number stored in files that have been processed in the background by the computer system 100. In step 603 the program 127 to recover lost changes table data determines whether any files 137 still remain on the permanent storage device 107 that have not had their update sequence numbers compared against the variable LargestProcessedUSN 139. In other words, a determination of whether any unexamined files 137 remain on the permanent storage device 107 is made. If unexamined files 137 still remain on the permanent storage device 107, then in step 605, the program 127 to recover lost changes table data retrieves a first unexamined file 137. In step 607 the program 127 to recover lost changes table data retrieves the value of the variable CurrentUSN 129 that is stored for a next file 137. In step 609 the program 127 to recover lost changes table data determines if the value of the variable CurrentUSN 129 from the next file 137 is greater than the value of the variable LargestProcessedUSN 139. If the value of the variable CurrentUSN 129 from the next file 137 is greater than the value of the variable LargestProcessedUSN 139 then, in step 611, the program 127 to recover lost changes table data stores the file identifier for file 137 in the changes table 119 of the computer memory 111 so that the computer system 100 can perform background processing on file 137. Upon completion of step 611 processing continues with step 603.

Returning to the discussion of step 609, if the program 127 to recover lost changes table data determines that the value of the variable CurrentUSN 129 stored for the retrieved file 139 is not greater than the value of the variable LargestProcessedUSN 139, processing continues with step 603 because the computer system 100 has already performed background processing on file 137.

Returning to the discussion of step 603, if the program 127 to recover lost changes table data determines that all files stored on the permanent storage device 107 have been examined, then processing continues with step 613. In short, the program 127 to recover lost changes table data determines that it has examined all files which were either created or edited and now must, in step 413, determine if background processing must be performed for any files that have been deleted.

Figure 7:
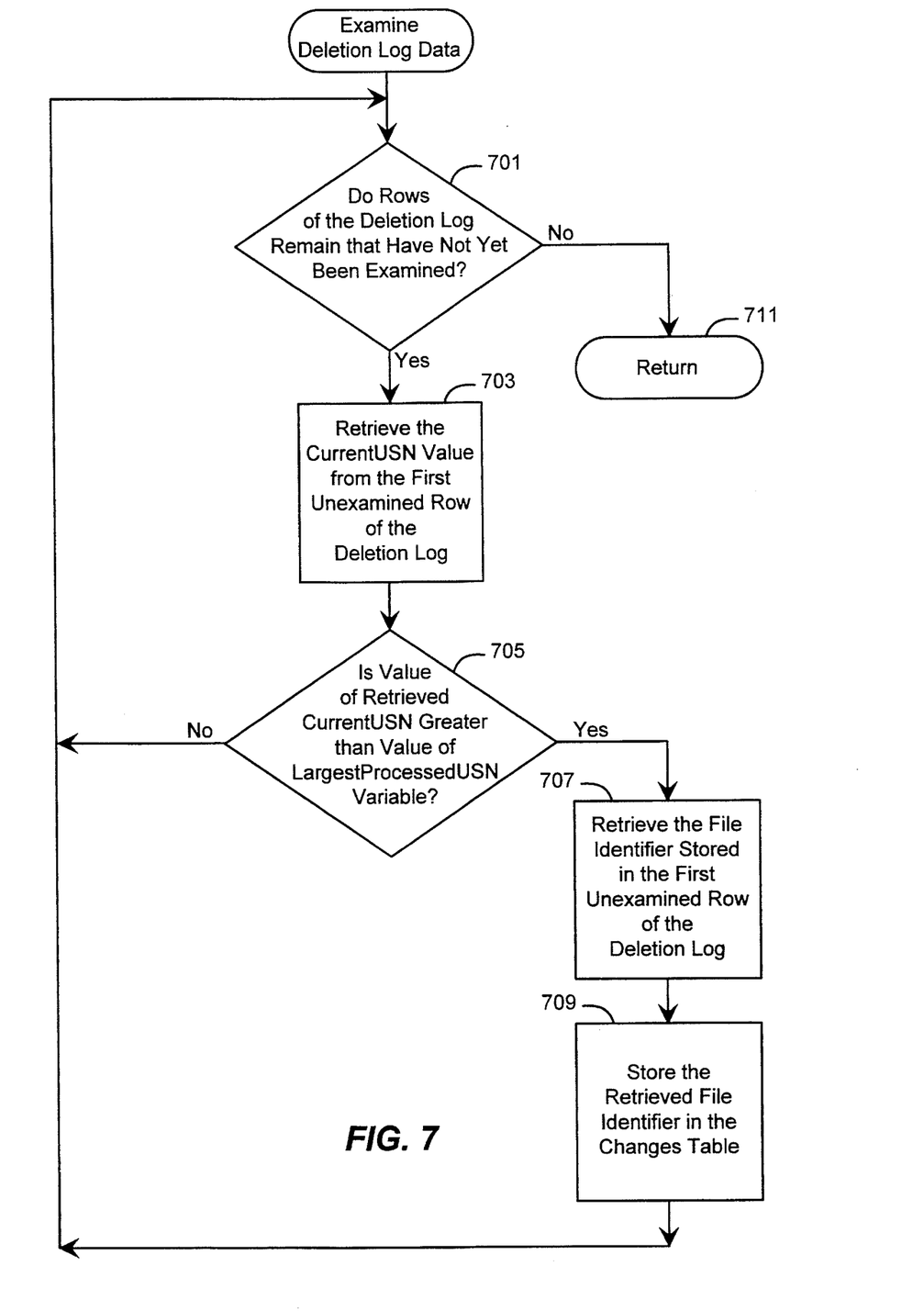
FIG. 7 is a flow diagram of the method to examine deletion log data for the system of FIG. 1.

In step 613 the program 127 to recover lost changes table data calls method 130 to examine deletion log data (described in more detail relative to FIG. 7). This method 130 restores file identifiers 201 for files that have been deleted from the computer system 100 but which still await background processing to the changes table 119. In short, the method 130 to examine deletion log data examines each row of the deletion log 135 to determine if the value of the variable CurrentUSN 129 stored therein is greater than the value of the variable LargestProcessedUSN 139. When CurrentUSN 129 is greater than LargestProcessedUSN 139, the file associated with the row is awaiting background processing. Therefore, when the variable CurrentUSN 129 stored in a row of the deletion log 135 is greater than the variable LargestProcessedUSN 139, the method 130 to examine deletion log data stores the file identifier from the row in the changes table 119. When the method 130 to examine deletion log data ends processing, the changes table 119 is populated with all file identifiers 201 for files that have been deleted but which still await background processing.

FIG. 7 shows the preferred steps of the method 130 to examine deletion log data. In step 701, the method 130 determines if any rows of the deletion log 135 remain to be examined. If any rows of the deletion log 135 remain to be examined then in step 703, the method retrieves the variable CurrentUSN 129 from the first unexamined row of the deletion log 135. In step 705, the method 130 to examine deletion log data determines if the value of the variable CurrentUSN 129 retrieved from the deletion log 135 is greater than the value of the variable LargestProcessedUSN 139 stored in the permanent storage device 107. If the value of the variable CurrentUSN 129 retrieved from the deletion log 135 is greater than the value of the variable LargestProcessedUSN 139 then in step 707 the method retrieves the file identifier stored in the first unexamined row of the deletion log 135. In step 709 the method stores the retrieved file identifier in the changes table 119 of the computer memory 111. Upon completion of step 709 processing continues with step 701.

Returning to the discussion of step 705 if the method determines that the value of the variable CurrentUSN 129 retrieved from the deletion log 135 is less than or equal to the value of the variable LargestProcessedUSN 139 then processing continues with step 701. In step 701, if all the rows of the deletion log 135 have been examined then in step 711, the method 130 to examine deletion log data returns processing control to the program 127 to recover lost changes table data of FIG. 6. When the method 130 to examine deletion log data ends processing, the changes table 119 is populated with file identifiers 201 for files that have been deleted but which still await background processing.

Returning to the discussion of the program 127 to recover lost changes table data with reference to FIG. 6, upon return of processing control from the method 130 to examine deletion log data in step 613, the program 127 to recover lost changes table data calls the method 132 to restore the update sequence number in step 615. Given that the program 127 to recover lost changes table data has restored the lost file identifiers 201 to the changes table 119, it computes a new value for the variable CurrentUSN 129 so that the variable CurrentUSN 129 can be stored in files awaiting processing. In short, the method 132 to restore the update sequence number sets the value of CurrentUSN 129 equal to the highest value that CurrentUSN 129 could have been set to before it was lost, plus one (i.e., CurrentUSN=MaxUSN+1). Method 132 is discussed in more detail below relative to the flow chart of FIG. 8. It then batch allocates a new set of valid values for CurrentUSN 129 by setting MaxUSN 131= MaxUSN 131+Delta 133.

Figure 8:
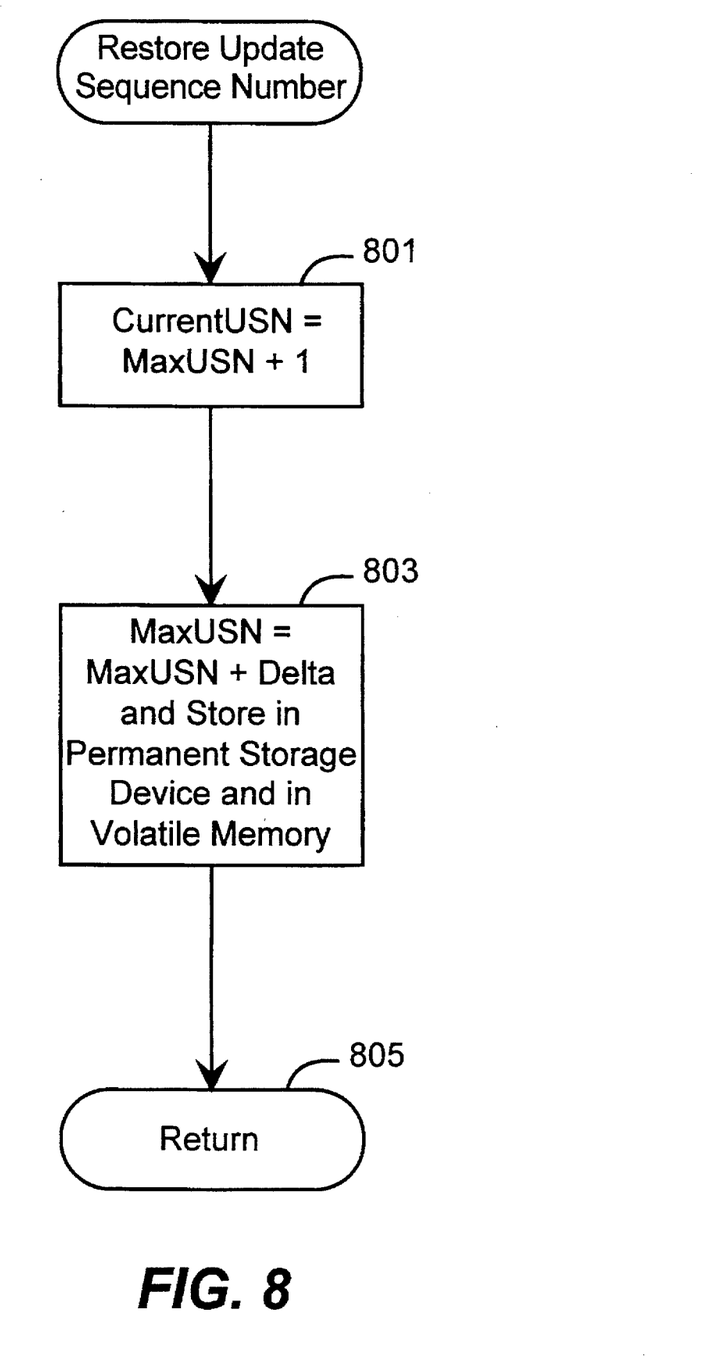
FIG. 8 is a flow diagram of the method to restore the update sequence number for the system of FIG. 1.

FIG. 8 shows the preferred steps of the method 132 to restore the update sequence number. In step 801 the variable CurrentUSN 129 is set equal to the value of the variable MaxUSN 131 stored on the permanent storage device 107 in summation with the value one. In step 803 the method 132 to restore the update sequence number sets the value of the variable MaxUSN 131 equal to the summation of the value of the variable Delta 133 and the value of the variable MaxUSN 131. The method 132 to restore the update sequence number stores the new value of the variable MaxUSN 131 on the permanent storage device 107 and in the computer memory 111. Upon completion of step 803, the method 132 to restore the update sequence number, in step 805, returns processing control to the program 127 to recover lost changes table data of FIG. 6.

Returning again to the discussion of the program 127 to recover lost changes table data with reference to FIG. 6, upon return of processing control from the method 132 to restore the update sequence number in step 615, the program 127 to recover lost changes table data, in step 617, ends processing. Even though processing related to the program 127 to recover lost changes table data ends in step 617, processing unrelated to the program 127 to recover lost changes table data can continue on the computer system 100.

By the time the program 127 to recover lost changes table data ends processing, the list of lost file identifiers 201 is restored to the changes table 119 and the variable CurrentUSN 129 is assigned a new value. The file system 117 uses the list of file identifiers 201 from the changes table 119 to retrieve the associated files 137 and to perform background processing on the files 137 by invoking the program 132 to perform background processing. In the preferred embodiment of the present invention, the background processing involves updating the content indices of the files. In this way, information about any file 137 can be retrieved quickly and easily from the content index. Nevertheless, those skilled in the art will appreciate that the present invention may also be implemented in other environments wherein files are awaiting other types of processing.

The program 132 to perform background processing, performs background processing on files listed in the changes table 119. After performing background processing on a file, the program 132 updates the value of the variable LargestProcessedUSN 139 by setting it equal to the value of the largest update sequence number from a file to which background processing has been performed. The program 132 then removes from the deletion log 135, the row of data associated with the file that the program 132 has just processed. This indicates that the file no longer awaits background processing.

Figure 9:
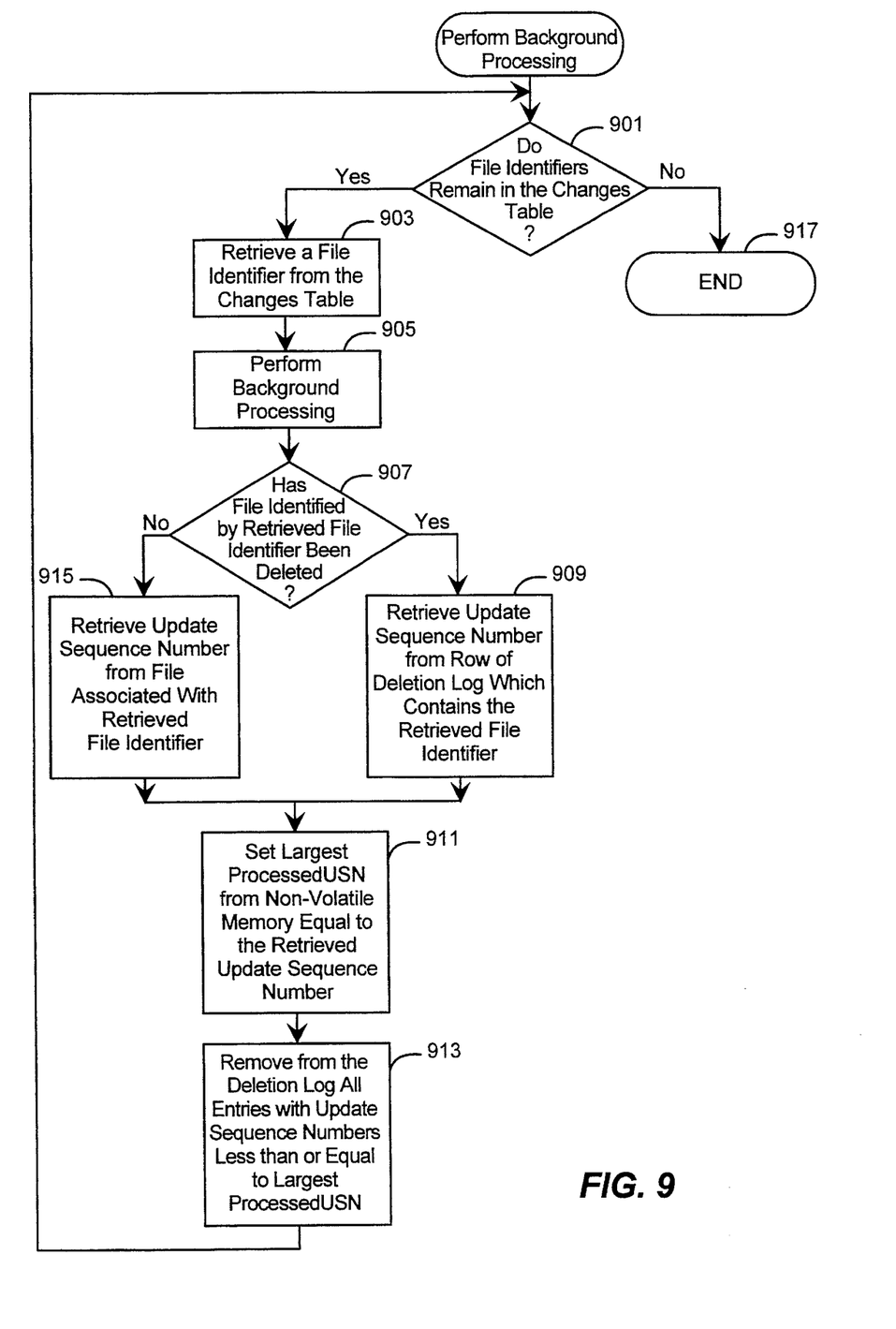
FIG. 9 is a flow diagram of the program to perform background processing for the system of FIG. 1.

FIG. 9 is a flowchart of the steps carried out by the program 132 to perform background processing. In step 901 the program 132 determines if any file identifiers 201 remain in the changes table 119. If file identifiers 201 do remain in the changes table 119, then in step 903, the program 132 retrieves a file identifier from the changes table 119. In step 905 the program 132 performs background processing. In step 907 the program 132 determines if the file identified by the retrieved file identifier 201 has been deleted from the computer system 100. If the file has been deleted then in step 909 the program 132 retrieves the update sequence number 503 from the row of the deletion log 135 (FIG. 5) which contains the file identifier 501 which corresponds with the retrieved file identifier 201 from the changes table 119. In step 911 the program 132 sets the variable LargestProcessedUSN 139, from the non-volatile permanent storage device 107, equal to the value of the retrieved update sequence number 503. In step 913 the program 132 removes from the deletion log 135 all entries with update sequence numbers less than or equal to the value of the variable LargestProcessedUSN 139. Upon completion of step 913 processing continues with step 901.

If in step 907 the program 132 determines that the file identified by the retrieved file identifier 201 has not been deleted from the computer system 100, then in step 915 the program 132 retrieves the update sequence number from the file associated with the retrieved file identifier 201. Upon completion of step 915 processing continues with steps 911 and 913 as discussed above.

If in step 901 the program 132 determines that file identifiers 201 do not remain in the changes table 119, then the program 132 to perform background processing ends processing in step 917. Even though processing related to the program 132 to perform background processing ends in step 917, processing unrelated to the program 132 to perform background processing can continue on a computer system 100.

Because the preferred embodiment recovers data lost from the changes table 119, it accurately tracks files and therefore ensures that background processing will be performed on the files 137. In this way the preferred embodiment of the present invention provides benefits over prior systems.

It will be appreciated that, although a specific embodiment of the invention has been described herein for purposes of illustration, various modifications may be made without departing from the spirit and scope of the invention. For example, while the update sequence number in the preferred embodiment described above has been illustrated as a monotonically increasing counter value, those of ordinary skill in the art will understand that the update sequence number can also be modeled as a monotonically decreasing counter value. Likewise, those of ordinary skill in the art will understand that numerous events can trigger the need to perform background processing, such as changes to a file, deletion of a file, and replication of a file. Accordingly, the invention is not limited except as by the appended claims.

We claim:

1. A computer implemented method of restoring data lost from a volatile storage, the computer including a second storage for storing a plurality of files, each file including associated file identifying information which identifies the file, the computer including a processor for processing the files, the method comprising the steps of:

providing update sequence values for files, each update sequence value indicating an order in which the file is to be processed relative to the other files;

storing identifying information for files to be processed by the computer in a portion of the volatile storage;

selecting a next file to be processed by examining the identifying information and update sequence value of files to be processed that are stored in the portion of the volatile storage;

processing the next file to be processed;

providing a threshold value equal to a largest update sequence value for the files that have been processed by the processor; and in response to a loss of the file identifiers stored in the portion of the volatile storage, storing in the portion of the volatile storage the file identifier for each file whose update sequence value surpasses the threshold value.

2. The method of claim 1, further comprising the step of providing a monotonically increasing counter whose value is incremented each time a file is created or changed and wherein the step of providing an update sequence value includes assigning to a file an update sequence value that is the current value of the monotonically increasing counter.

3. The method of claim 1, further comprising the step of providing a monotonically decreasing counter whose value is decremented each time a file is created or changed and wherein the step of providing an update sequence value includes assigning to a file an update sequence value that is a current value of the monotonically decreasing counter.

4. The method of claim 1, further including the steps of:

providing an upper limit value which indicates a maximum value that can be assigned to the update sequence value without first increasing the upper limit value;

providing a delta value;

in response to a loss of the update sequence value setting the update sequence value to a value greater than the upper limit value; and setting the upper limit value to a summation of a current value of the upper limit value and the delta value.

5. A computer implemented method of restoring data lost from a volatile storage, the computer including a second storage for storing a plurality of files, the computer including a processor for processing the files, the method comprising the steps of:

providing a monotonically increasing counter whose value is incremented each time a file is created or changed;

assigning to files a current value of the monotonically increasing counter as a sequence value;

maintaining a list of files awaiting processing in the first storage;

rebuilding the list of files in the volatile storage in the event that the list of files is lost, by examining the values assigned to the files and adding to the list, files having sequence values greater than a sequence value of a last file to be processed before the loss occurred.

6. A computer implemented method of restoring data lost from a volatile storage, the data including file identifiers which identify files stored on the computer, the computer including a processor for processing the files, each file including a file identifier which identifies the file, the method comprising the steps of:

changing contents of a selected file;

assigning an update sequence value for the selected file as a current value of a monotonically increasing counter, said update sequence value indicating an order in which the selected file will be processed relative to the other files;

storing the update sequence value in the selected file;

storing the selected file with the update sequence value in a second storage, the second storage being arranged such that when the volatile storage loses data, the second storage does not lose data;

storing the file identifier identifying the selected file in the volatile storage;

processing by the processor at least one of the files listed in the volatile storage;

determining a largest processed update sequence value from the files that have been processed by the computer;

in response to a loss of the file identifiers stored in the volatile storage, determining if the update sequence value stored in the selected file is greater than the largest processed update sequence value; and in response to a determination that the update sequence value stored in the selected file is greater than the largest processed update sequence value, storing in the volatile storage the file identifier for the selected file.

7. The method of claim 6, further including the steps of:

providing an upper limit value which indicates a maximum value that can be assigned to the update sequence value without first increasing the upper limit value;

providing a delta value;

in response to a loss of the update sequence value, setting the update sequence value to a value greater than the upper limit value; and setting the upper limit value to a summation of the upper limit value and the delta value.

8. A computer implemented method of restoring data lost from a volatile storage, the data including file identifiers which identify files stored on the computer, the computer including a processor for processing the files, each file including identifying information which identifies the file, the method comprising the steps of:

selecting a file;

determining an update sequence value which indicates an order in which the selected file will be processed relative to the other files;

storing the identifying information and the update sequence value of the selected file in a second storage, the second storage being arranged such that when the first storage loses data, the second storage does not lose data;

processing by the processor at least one of the files listed in the volatile storage;

determining a most extreme processed update sequence value from the files that have been processed by the computer;

in response to a loss of identifying information for files stored in the volatile storage, determining if the update sequence value of the selected file surpasses the most extreme processed update sequence value; and in response to a determination that the update sequence value of the selected file surpasses the most extreme processed update sequence value, storing in the volatile storage the file identifier of the selected file.

9. The method of claim 8, further including the steps of:

providing an upper limit value which indicates a maximum value that can be assigned to the update sequence value without first increasing the upper limit value;

providing a delta value which indicates a value by which to increase the upper limit value;

in response to a loss of the update sequence value setting the update sequence value to a value greater than the upper limit value; and setting the upper limit value to a summation of the upper limit value and the delta value.

10. The method of claim 8 wherein the step of determining an update sequence value further comprises the step of providing a monotonically increasing counter whose value is incremented each time a file is created or changed.

11. The method of claim 8 wherein the step of determining an update sequence value further comprises the step of providing a monotonically decreasing counter whose value is decremented each time a file is created or changed.

12. A method in a computer system for automatically generating an index representing data contained in a file, the computer system including a volatile storage, a processor for processing said method, and a second storage for storing at least one file comprising data, the method comprising the steps of:

provided identifying information for at least one of the files which identifies the file and an update sequence value indicating an order, relative to the other files, in which the file was processed by the computer;

providing a portion of the volatile storage for storing the identifying information of files awaiting processing by the processor;

providing a threshold value equal to the largest update sequence value from the files that have been processed by the computer;

in response to a loss of the identifying information for files stored in the portion of the volatile storage, storing in the portion of the volatile storage the file identifier for each file whose update sequence value surpasses the threshold value;

selecting one of the file identifiers stored in the volatile storage;

retrieving the file indicated by the selected file identifier; and automatically generating the index for the retrieved file from the data stored in the retrieved file.

13. The method of claim 12 wherein the index comprises at least a first and second data element, the first data element comprising a portion of the data from the retrieved file, and the second data element comprising a position of the portion of the data in the retrieved file, and wherein said step of automatically generating an index further comprising storing the portion of the data and the position of the portion of the data in the index.

14. The method of claim 12 wherein the index comprises at least a first and second data element, the first data element comprising a portion of the data from the retrieved file and the second data element comprising the identifying information of the file, and wherein said step of automatically generating an index further comprising storing the portion of the data and the identifying information in the index.

15. A computer system for processing a file, the file having at least one index representing data contained in the file, the computer system comprising:

a plurality of files stored in a second storage, each file having identifying information which identifies the file and each file including an update sequence value indicating an order in which the file was processed;

a portion of a volatile storage for storing identifying information for files to be processed by the computer;

a threshold value equal to a most extreme update sequence value from the files that have been processed by the computer;

in response to a loss of the identifying information for the files stored in the portion of the volatile storage, means for storing in the portion of the volatile storage the file identifying information for each file whose update sequence value is beyond the threshold value;

means for retrieving identifying information from the volatile storage;

means for retrieving the file indicated by the retrieved identifying information; and means for automatically storing in the index for the retrieved file, data from the retrieved file in order to complete processing the file in a preferred manner.

16. The computer system of claim 15 wherein the index further comprising at least a first and second data element, the first data element comprising a portion of the data from the retrieved file, and the second data element comprising a position of the portion of the data in the retrieved file and wherein said means for automatically storing in the index further comprises storing the portion of the data and the position of the portion of the data in the index.

17. The computer system of claim 15 where the index further comprising at least a first and second data element, the first data element comprising a portion of the data from the retrieved file, and the second data element comprising identifying information, and wherein said means for automatically storing in the index further comprises storing the portion of the data and the identifying information in the index.

* * * * *